(12) United States Patent
Tagawa et al.

(10) Patent No.: US 10,148,195 B2
(45) Date of Patent: Dec. 4, 2018

(54) POWER CONVERTER FOR OUTPUTTING THREE-PHASE ALTERNATING-CURRENT VOLTAGES TO A POWER SYSTEM

(71) Applicant: Murata Manufacturing Co., Ltd., Nagaokakyo-shi, Kyoto-fu (JP)

(72) Inventors: Shuichi Tagawa, Nagaokakyo (JP); Hiroyuki Yasui, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/021,414

(22) Filed: Jun. 28, 2018

(65) Prior Publication Data

US 2018/0309389 A1    Oct. 25, 2018

Related U.S. Application Data

(63) Continuation of application No. PCT/JP2016/085267, filed on Nov. 29, 2016.

(30) Foreign Application Priority Data

Jan. 8, 2016 (JP) .................... 2016-002467

(51) Int. Cl.
*H02M 7/537* (2006.01)

(52) U.S. Cl.
CPC .................... *H02M 7/537* (2013.01)

(58) Field of Classification Search
CPC .............. H02M 1/38; H02M 5/458; H02M 2001/0009; H02M 2001/385
See application file for complete search history.

(56) References Cited

U.S. PATENT DOCUMENTS 5,550,450 A * 8/1996 Palko ............... H02M 7/53875
187/316
5,850,132 A * 12/1998 Garces .................. G05B 11/28
318/599

(Continued)

FOREIGN PATENT DOCUMENTS

JP     H09154280 A    6/1997
JP     2006320122 A    11/2006

(Continued)

OTHER PUBLICATIONS

International Search Report issued in International Application No. PCT/JP2016/085267, dated Jan. 24, 2017.

(Continued)

*Primary Examiner* — Yusef A Ahmed
(74) *Attorney, Agent, or Firm* — Arent Fox LLP

(57) ABSTRACT

In a power converter that converts a direct-current voltage into three-phase alternating-current voltages and outputs the three-phase alternating-current voltages to a power system. The power converter includes a microprocessor that sets a dead time during which high-side switching elements and low-side switching elements are simultaneously off, and carries out switching. Moreover, the microprocessor performs dq transformation using complex numbers of phase currents, and detects an amplitude value of d-axis current or q-axis current. The microprocessor changes a phase difference to reduce the amplitude value of d-axis current or q-axis current. The microprocessor then performs dead-time compensation on the basis of the resulting phase difference.

19 Claims, 6 Drawing Sheets

(56) References Cited

U.S. PATENT DOCUMENTS

| | | | |
|---|---|---|---|
| 7,057,361 B2* | 6/2006 | Kitahata | H02M 5/458 318/139 |
| 8,693,221 B2 | 4/2014 | Ochi et al. | |
| 9,444,369 B2 | 9/2016 | Suzuki | |
| 2006/0001392 A1* | 1/2006 | Ajima | B62D 5/046 318/432 |
| 2008/0203962 A1* | 8/2008 | Maeda | H02P 6/16 318/721 |
| 2009/0251831 A1* | 10/2009 | Shiba | B60L 3/003 361/30 |
| 2011/0115420 A1* | 5/2011 | Yamada | H02P 27/04 318/400.09 |
| 2012/0106221 A1 | 5/2012 | Ochi et al. | |
| 2012/0206075 A1* | 8/2012 | Kimpara | B62D 5/0424 318/400.15 |
| 2012/0217849 A1* | 8/2012 | Aoki | H02P 6/18 310/68 D |
| 2012/0306415 A1* | 12/2012 | Kawakami | H02P 6/10 318/400.23 |
| 2013/0063059 A1* | 3/2013 | Chi | H02P 27/08 318/400.13 |
| 2013/0127383 A1* | 5/2013 | Kawamura | H02P 27/085 318/400.09 |
| 2013/0271047 A1* | 10/2013 | Imamura | B62D 5/046 318/400.2 |
| 2014/0042938 A1* | 2/2014 | Shoji | H02P 21/14 318/400.02 |
| 2014/0062375 A1* | 3/2014 | Suzuki | H02P 21/12 318/496 |
| 2014/0125264 A1* | 5/2014 | Nakamura | H02P 6/10 318/400.23 |
| 2014/0152214 A1* | 6/2014 | Furukawa | B60L 15/025 318/400.13 |
| 2014/0225537 A1* | 8/2014 | Omata | H02P 21/26 318/400.02 |
| 2014/0225540 A1* | 8/2014 | Omata | H02P 6/002 318/400.07 |
| 2015/0075898 A1* | 3/2015 | Suzuki | B62D 5/0472 363/132 |
| 2015/0077025 A1* | 3/2015 | Suzuki | B62D 5/0463 318/400.02 |
| 2015/0256117 A1* | 9/2015 | Suzuki | F24F 5/001 62/160 |
| 2015/0333681 A1* | 11/2015 | Matsuki | H02P 21/06 318/400.02 |
| 2016/0028339 A1* | 1/2016 | Nakai | H02P 29/0038 318/400.02 |
| 2016/0028340 A1* | 1/2016 | Nakai | H02P 21/06 318/400.02 |
| 2016/0111991 A1* | 4/2016 | Hozuki | H02P 21/18 318/400.02 |
| 2016/0185384 A1* | 6/2016 | Kodera | B62D 5/0469 701/41 |
| 2016/0315577 A1* | 10/2016 | Suzuki | H02P 29/50 |
| 2017/0019052 A1* | 1/2017 | Suzuki | B62D 5/04 |
| 2017/0131379 A1* | 5/2017 | Omata | G01R 35/00 |
| 2017/0294862 A1* | 10/2017 | Takahashi | H02P 21/22 |
| 2017/0373627 A1* | 12/2017 | Suzuki | H02P 21/20 |

FOREIGN PATENT DOCUMENTS

| | | |
|---|---|---|
| JP | 2008086083 A | 4/2008 |
| JP | 2010268583 A | 11/2010 |
| JP | 2011211875 A | 10/2011 |
| JP | 2012100444 A | 5/2012 |
| JP | 2015061381 A | 3/2015 |

OTHER PUBLICATIONS

Written Opinion of the International Searching Authority issued in International Application No. PCT/JP2016/085267, dated Jan. 24, 2017.

* cited by examiner

POWER CONVERTER FOR OUTPUTTING THREE-PHASE ALTERNATING-CURRENT VOLTAGES TO A POWER SYSTEM

CROSS REFERENCE TO RELATED APPLICATIONS

The present application is a continuation of PCT/JP2016/085267 filed Nov. 29, 2016, which claims priority to Japanese Patent Application No. 2016-002467, filed Jan. 8, 2016, the entire contents of each of which are incorporated herein by reference.

TECHNICAL FIELD

The present disclosure relates to a power converter that outputs an alternating-current voltage obtained by converting a direct-current voltage to a power system.

BACKGROUND

Currently, for inverter circuits formed by connecting a high-side switching element and a low-side switching element in series, a time period (dead time) can be set during which both the switching elements are off. This is to prevent the two switching elements from being simultaneously turned on (or short-circuited). Setting the dead time causes distortion of output current of the inverter circuit.

A technique to reduce distortion of output voltage is described in Patent Document 1 (identified below) in which a PWM converter adds a compensation signal to a voltage command value to compensate for an error voltage caused by the dead time. In the technique described in Patent Document 1, a current phase is determined from a power supply voltage phase detection value, and dead-time compensation is performed in accordance with the determined current phase.

Patent Document 1: Japanese Unexamined Patent Application Publication No. 9-154280.

However, voltage and current have a phase difference that constantly varies, and it is difficult to always accurately detect a phase current. With the technique described in Patent Document 1, therefore, it is difficult to appropriately perform dead-time compensation in accordance with current distortion that occurs in real time. Alternating current may be directly detected to adjust a current phase during execution of a fast Fourier transform (FFT), but this is less realistic because a large amount of computation is required and a heavy load is placed on the processor.

SUMMARY OF THE INVENTION

Accordingly, an object of the present disclosure is to provide a power converter that accurately performs dead-time compensation.

Thus, an exemplary embodiment of the present disclosure provides a power converter that converts a direct-current voltage into three-phase alternating-current voltages and outputs the three-phase alternating-current voltages to a power system. The power converter includes an inverter circuit including three series circuits each formed by connecting a high-side switching element and a low-side switching element in series. Moreover, a PWM controller is configured to set a dead time during which the high-side switching element and the low-side switching element of each of the series circuits are simultaneously off. In this aspect, the PWM controller is configured to switch the high-side switching element and the low-side switching element on the basis of a PWM voltage command value. Furthermore, a calculating unit is configured to calculate the amount of dead-time compensation for reducing distortion caused by setting the dead time; a dead-time compensation unit is configured to add the amount of dead-time compensation to the PWM voltage command value, with a shift of a deemed phase difference from a phase of each of the three-phase alternating-current voltages; a current amplitude detector is configured to detect an amplitude value of d-axis current or q-axis current in a rotating coordinate system obtained by dq transformation of output currents from the respective three series circuits; and a changing unit is configured to change the deemed phase difference to reduce the amplitude value detected by the current amplitude detector.

In this configuration, dead-time compensation is performed on the basis of the amplitude value of d-axis current or q-axis current in a rotating coordinate system obtained by dq transformation of a triaxial reference system. Therefore, the dead-time compensation can be accurately performed in real time without requiring a large amount of computation.

The power converter according to an exemplary embodiment may further include a reactive power output controller configured to output reactive power to the power system when a system voltage of the power system exceeds a threshold. When the reactive power output controller outputs the reactive power, the changing unit stops changing the deemed phase difference.

Outputting the reactive power to the power system causes the d-axis current (or q-axis current) to fluctuate. Dead-time compensation performed on the basis of the amplitude value of the fluctuating d-axis current (or q-axis current) does not stabilize the output of the power converter. Therefore, when reactive power is output to the power system, the output of the power converter can be stabilized by stopping the changing of the deemed phase difference.

The exemplary embodiments of the present disclosure enable accurate dead-time compensation in real time without requiring a large amount of computation.

DETAILED DESCRIPTION OF EMBODIMENTS

Figure 1A:
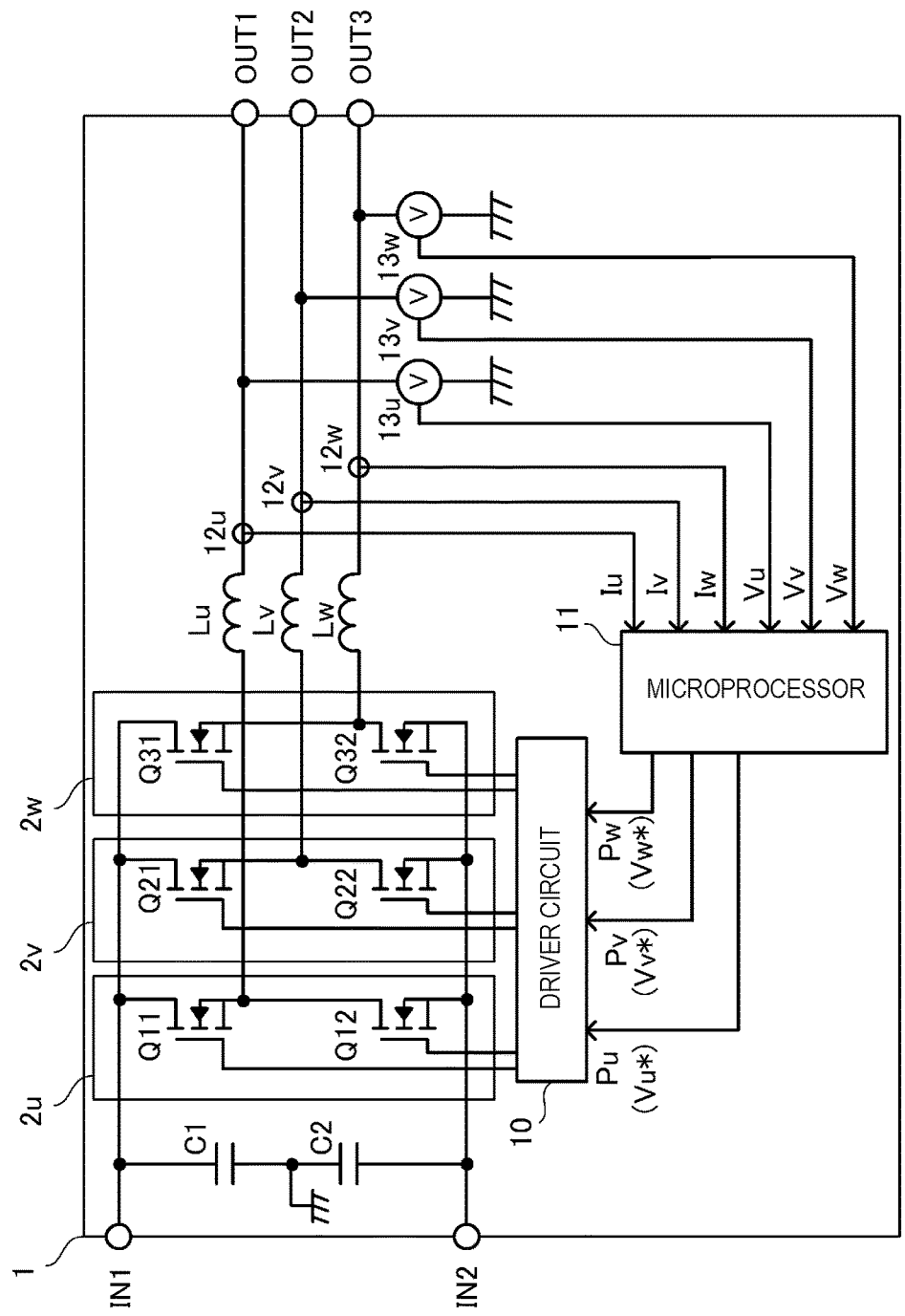
FIG. 1A is a circuit diagram of a power converter according to an exemplary embodiment.

FIG. 1A is a circuit diagram of a power converter 1 according to the present exemplary embodiment. The power converter 1 can be used, for example, for a home energy management system (HEMS). The power converter 1 is a PWM inverter that receives, through input portions IN1 and IN2, a direct-current voltage output from a solar, gas, or wind power generator, for example, converts the received direct-current voltage into three-phase alternating-current voltages, and outputs the three-phase alternating-current voltages through output portions OUT1, OUT2, and OUT3 to a power system (not shown). Here, it is contemplated that the power system is a distribution system that transmits power from a distribution substation of a power company.

Moreover, a series circuit of capacitors C1 and C2 is connected to the input portions IN1 and IN2. A switching circuit is also connected to the input portions IN1 and IN2. The switching circuit (inverter circuit) is formed by connecting, in parallel, series circuits 2u, 2v, and 2w that output U-phase, V-phase, and W-phase (three-phase) alternating-current voltages, respectively. The series circuits 2u, 2v, and 2w are each formed by connecting in series a corresponding one of high-side switching elements Q11, Q21, and Q31 and a corresponding one of low-side switching elements Q12, Q22, and Q32. Each of the switching elements is turned on and off by a PWM signal generated by a driver circuit 10 and input to its gate. For example, the switching elements are MOSFETs or IGBTs according to exemplary aspects. When the switching elements are IGBTs, each switching element requires a freewheeling diode.

As further shown, a node between the high-side switching element Q11 and the low-side switching element Q12 is connected to the output portion OUT1, with an inductor Lu interposed therebetween. A node between the high-side switching element Q21 and the low-side switching element Q22 is connected to the output portion OUT2, with an inductor Lv interposed therebetween. A node between the high-side switching element Q31 and the low-side switching element Q32 is connected to the output portion OUT3, with an inductor Lw interposed therebetween. The inductors Lu, Lv, and Lw eliminate harmonic components superimposed on alternating currents output from the switching circuit.

A U-phase line is provided with a current detecting circuit 12U and a voltage detecting circuit 13U configured to detect a phase current Iu and a phase voltage Vu, respectively, of the series circuit 2u. A V-phase line is provided with a current detecting circuit 12V and a voltage detecting circuit 13V configured to detect a phase current Iv and a phase voltage Vv, respectively, of the series circuit 2v. A W-phase line is provided with a current detecting circuit 12W and a voltage detecting circuit 13W configured to detect a phase current Iw and a phase voltage Vw, respectively, of the series circuit 2w. Detection signals of the current detecting circuits 12U, 12V, and 12W and detection signals of the voltage detecting circuits 13U, 13V, and 13W are all fed or input to a microprocessor 11.

The microprocessor 11 corresponds to "PWM controller", "calculating unit" (i.e., a dead-time compensation calculator), "dead-time compensation unit", "current amplitude detector", and "changing unit" (i.e., a deemed phase difference adjustor) according to the present invention. Moreover, it is noted that the microprocessor 11 can include memory with software stored thereon that, when executed by the microprocessor 11, is configured to perform the algorithms described herein as would be understood to one skilled in the art.

Figure 1B:
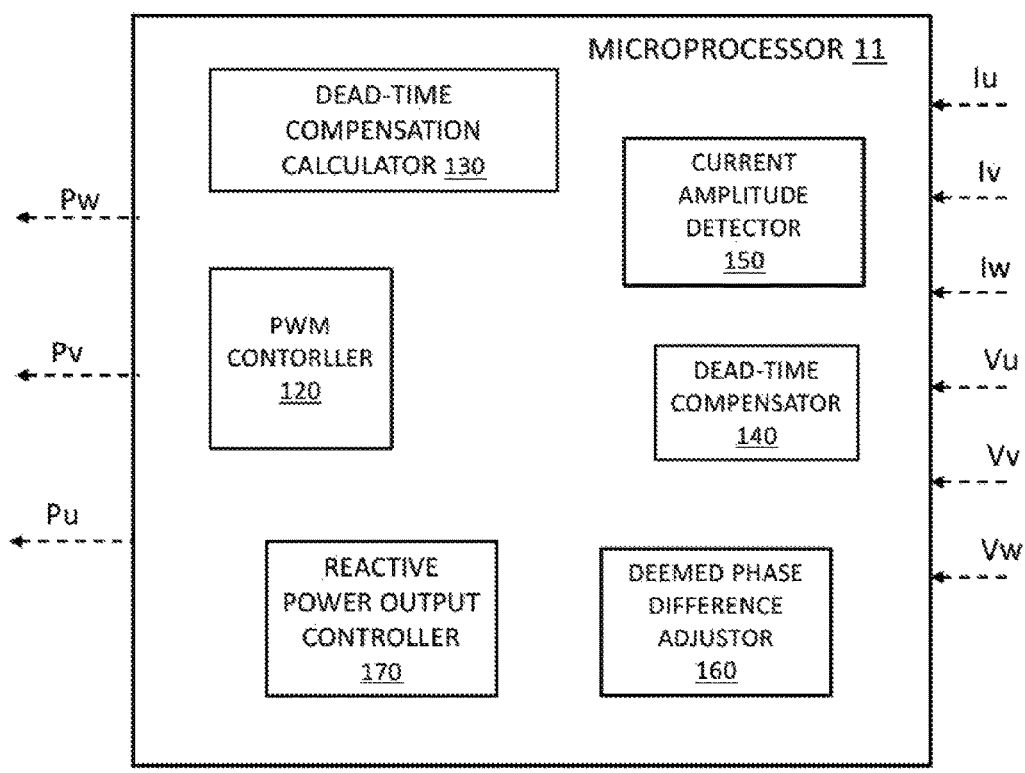
FIG. 1B is an exemplary block diagram of the microprocessor 11 of the circuit diagram illustrated in FIG. 1A.

FIG. 1B is an exemplary block diagram of the microprocessor 11 of the circuit diagram illustrated in FIG. 1A. As shown in FIG. 1B, the microprocessor 11 can include PWM controller 120, a dead-time compensation calculator 130, dead-time compensator 140, current amplitude detector 150, deemed phase difference adjustor 160, and reactive power output controller 170, according to an exemplary aspect.

As further shown in FIG. 1A, the microprocessor 11 outputs command signals Pu, Pv, and Pw to the driver circuit 10 such that the detected phase voltages Vu, Vv, and Vw match voltage command values Vu*, Vv*, and Vw*, respectively, and switching-controls the switching circuit using the driver circuit 10. Specifically, the microprocessor 11 switching-controls the series circuits 2u, 2v, and 2w in such a manner that the phases of the phase voltages of the series circuits 2u, 2v, and 2w are shifted by 120° with each other according to the exemplary aspect.

In this aspect, the microprocessor 11 sets a dead time during which the high-side switching elements Q11, Q21, and Q31 and the corresponding low-side switching elements Q12, Q22, and Q32 are simultaneously off, and alternately turns on and off the high-side and low-side switching elements.

Figure 2:
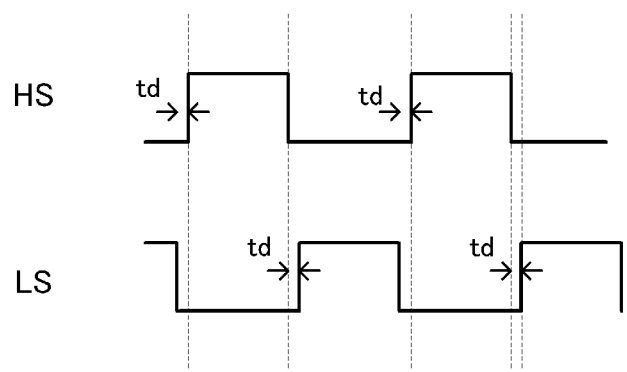
FIG. 2 shows waveforms of PWM signals applied to high-side and low-side switching elements.

FIG. 2 shows waveforms of PWM signals applied to the high-side switching elements (HS) Q11, Q21, and Q31 and the low-side switching elements (LS) Q12, Q22, and Q32.

The microprocessor 11 sets a dead time td for each of the PWM signals output to the high-side switching elements Q11, Q21, and Q31 and the low-side switching elements Q12, Q22, and Q32. This is a period (dead time) during which both the high-side switching elements Q11, Q21, and Q31 and the low-side switching elements Q12, Q22, and Q32 are off. That is, in the dead time td, the high-side and low-side switching elements are momentarily turned off at the same time.

Setting the dead time td interrupts continuity of the phase currents Iu, Iv, and Iw. As a result, the phase currents Iu, Iv, and Iw are distorted and fail to form a sine wave. The distortion caused by the dead time mainly appears in the form of six-fold harmonic components.

The microprocessor 11 is thus configured to execute dead-time compensation that compensates for error voltages caused by the dead time. Performing the dead-time compensation reduces the value of total harmonic distortion (THD). The THD is a distortion factor representing the ratio of all harmonic components to the fundamental component. The smaller the THD, the lower the level of distortion caused by the dead time and the closer the waveforms of the phase currents Iu, Iv, and Iw are to a sine wave.

The power converter 1 according to the present embodiment is connected at the output portions OUT1, OUT2, and OUT3 to the power system. When the power converter 1 outputs a current to the power system, THD is required to be about 5% or less.

Dead-time compensation executed by the microprocessor 11 will now be described.

The microprocessor 11 calculates the amount of dead-time compensation $\Delta V$ from a switching frequency fc of the series circuits 2u, 2v, and 2w, a direct-current voltage Vdc input from the input portions IN1 and IN2, and the dead time td. The amount of dead-time compensation $\Delta V$ can be expressed by the following equation:

$$\Delta V \text{ [V]} = td \text{ [ms]} \times fc \text{ [kHz]} \times Vdc \text{ [V]} \times \text{sign}(i)$$

Dead-time compensation is done by adding the calculated amount of dead-time compensation $\Delta V$ to the voltage command values Vu*, Vv*, and Vw*.

In the equation described above, sign(i) represents the current polarity of the inductors Lu, Lv, and Lw. If i>0 is satisfied, sign(i)=1, whereas if i<0 is satisfied, sign(i)=−1. During the period of dead time, currents in the inductors Lu, Lv, and Lw circulate through body diodes or freewheeling diodes of the switching elements in accordance with the current polarity. That is, voltages output from the series circuits 2u, 2v, and 2w during the period of dead time depend on the current polarity. Therefore, if the phase voltages Vu, Vv, and Vw are negative, the amount of dead-time compensation ΔV added is positive, whereas if the phase voltages Vu, Vv, and Vw are positive, the amount of dead-time compensation ΔV added is negative.

Moreover, the phase voltages Vu, Vv, and Vw and the phase currents Iu, Iv, and Iw have the phase difference Δθ. The phase difference Δθ varies in real time depending on the load connected to the power system. Therefore, the microprocessor 11 cannot obtain the phase currents Iu, Iv, and Iw having a waveform close to a sine wave without adding the amount of dead-time compensation ΔV to the voltage command values Vu*, Vv*, and Vw*, with a shift of the phase difference Δθ varying in real time from the phases of the three-phase alternating-current voltages. The phase difference Δθ corresponds to "deemed phase difference" according to the present disclosure.

Thus, according to the exemplary embodiment, the microprocessor 11 performs control that searches for the optimum phase difference Δθ described below.

The microprocessor 11 performs dq transformation using complex numbers of the obtained phase currents Iu, Iv, and Iw and calculates d-axis current (or q-axis current) in a rotating coordinate system. The microprocessor 11 then detects the amplitude value of the d-axis current (or q-axis current). Since the d-axis current and the q-axis current correspond to two orthogonal components of torque applied to the rotor of a three-phase motor, if the three-phase currents form a perfect sine wave, the range of fluctuation of the d-axis current and the q-axis current is zero. That is, the d-axis current and the q-axis current have a strong correlation with harmonic distortion. Therefore, by performing control to reduce the amplitude value of the d-axis current (or q-axis current), the level of distortion of the phase currents Iu, Iv, and Iw is reduced.

Figure 3:
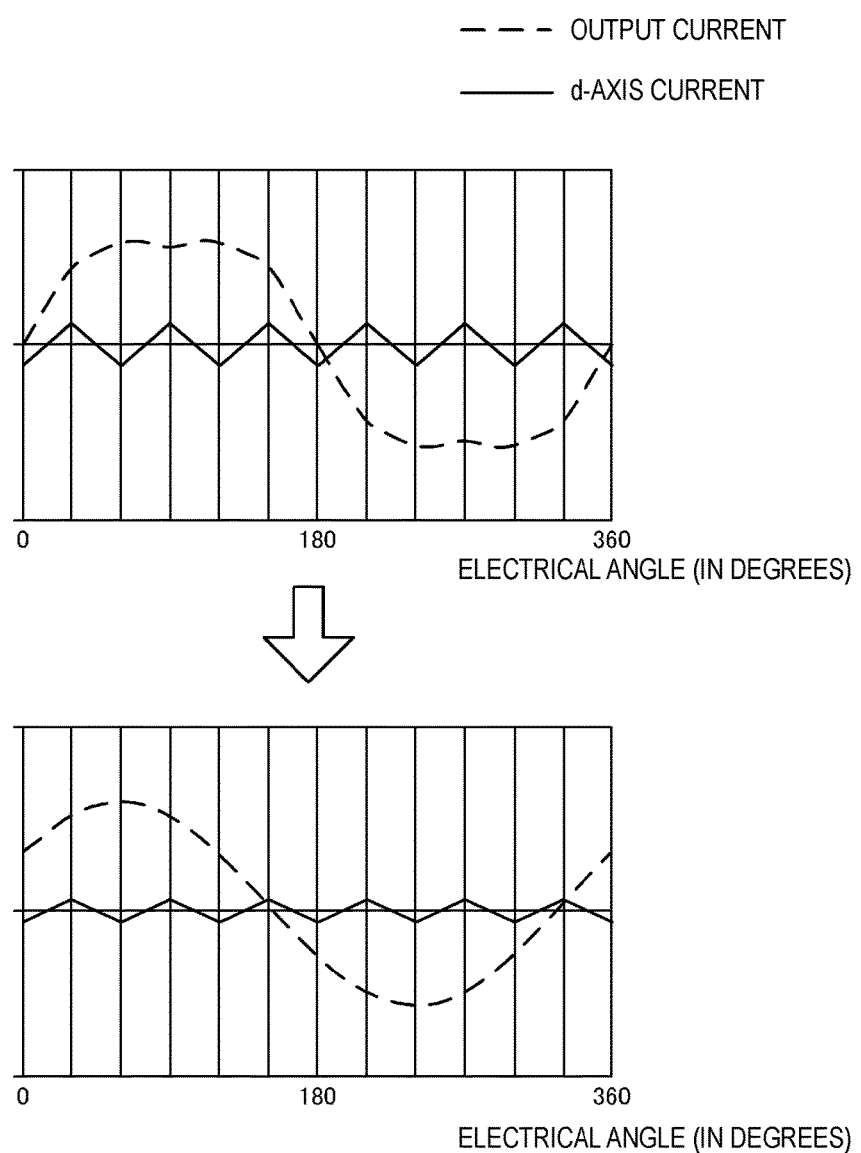
FIG. 3 shows waveforms of phase current and d-axis current.

FIG. 3 shows waveforms of phase current and d-axis current. The d-axis current pulses at a frequency that is six times the system frequency. A comparison between the upper and lower parts of FIG. 3 shows that when the amplitude of the d-axis current is reduced, the waveform of the phase current becomes closer to a sine wave.

To reduce the amplitude value of the d-axis current (or q-axis current), the microprocessor 11 is configured to adjust the phase difference Δθ by shifting it, for example, in increments of 0.1° per cycle (50 Hz or 60 Hz) of the system voltage in the lagging or leading direction. The microprocessor 11 then adds the amount of dead-time compensation ΔV to the voltage command values Vu*, Vv*, and Vw* with a shift of the adjusted phase difference Δθ. This reduces the amplitude value of the d-axis current.

Figure 4:
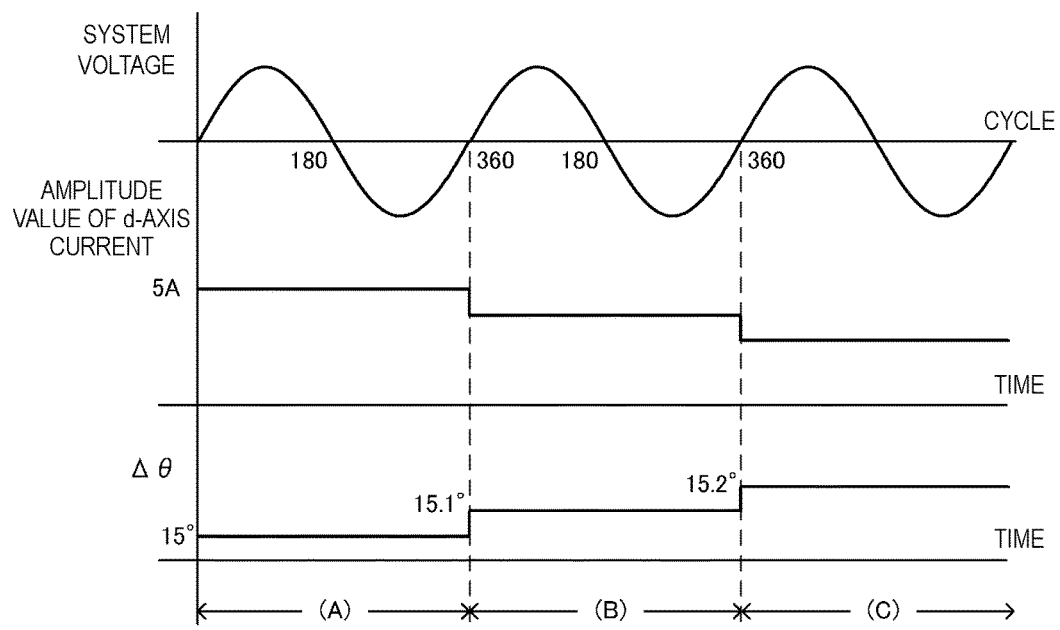
FIG. 4 is a diagram for explaining a technique that shifts a phase difference in the same direction to adjust the phase difference.
Figure 5:
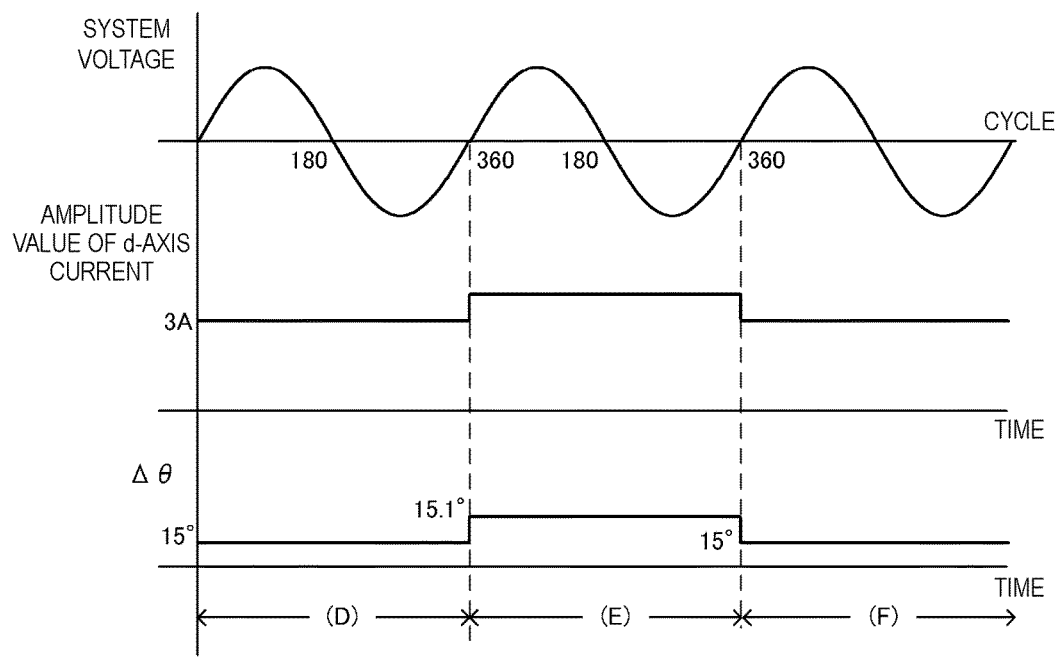
FIG. 5 is a diagram for explaining a technique that shifts a phase difference in the opposite direction to adjust the phase difference.

FIGS. 4 and 5 are diagrams for explaining how the phase difference Δθ is adjusted to reduce the amplitude value of the d-axis current (or q-axis current).

In the example illustrated in FIG. 4, at the beginning of period (A), the microprocessor 11 performs dead-time compensation, with the initial value of the phase difference Δθ set to 15°, and thus the amplitude value of the d-axis current becomes 5 A. At the end of the period (A) (or at the beginning of period (B)), the microprocessor 11 shifts the phase difference Δθ by 0.1° in the leading direction to make the phase difference Δθ=15.1°.

As a result, the amplitude value of the d-axis current in period (B) becomes smaller than the amplitude value 5 A in period (A). At the end of period (B) (or at the beginning of period (C)), the microprocessor 11 further shifts the phase difference Δθ by 0.1° in the same direction as that in the previous adjustment (i.e., in the leading direction) to make the phase difference Δθ=15.2°. As a result, the amplitude value of the d-axis current in period (C) becomes smaller than the amplitude value in period (B).

The microprocessor 11 is configured to repeat the process described above.

Shifting the phase difference Δθ may increase the amplitude value of the d-axis current. In this case, further shifting the phase difference Δθ in the same direction as that in which the phase difference Δθ has been shifted in the previous adjustment is highly likely to further increase the amplitude value of the d-axis current. Accordingly, in this case, the microprocessor 11 shifts the phase difference Δθ in the direction opposite that in which the phase difference Δθ has been shifted in the previous adjustment.

In the example illustrated in FIG. 5, at the beginning of period (D), the microprocessor 11 performs dead-time compensation, with the initial value of the phase difference Δθ set to 15°, and thus the amplitude value of the d-axis current becomes 3 A. At the end of period (D) (or at the beginning of period (E)), the microprocessor 11 shifts the phase difference Δθ by 0.1° in the leading direction to make the phase difference Δθ=15.1°.

As a result, the amplitude value of the d-axis current in period (E) becomes larger than the amplitude value 3 A in period (D). In this case, the microprocessor 11 shifts the phase difference Δθ by 0.1° in the direction (i.e., lagging direction) opposite that in the previous adjustment to make the phase difference Δθ=15°. As a result, the amplitude value of the d-axis current in period (F) becomes smaller than the amplitude value in period (E).

As described above, if shifting the phase difference Δθ increases the amplitude value of the d-axis current, the microprocessor 11 shifts the phase difference Δθ in the direction opposite that in which the phase difference Δθ has been shifted in the previous adjustment. The microprocessor 11 is thus configured to make an adjustment to reduce the amplitude value of the d-axis current.

If the detected amplitude value of the d-axis current (or q-axis current) changes abruptly, the microprocessor 11 may eliminate the amplitude value as noise and carry out detection of the amplitude value again.

The phase difference Δθ is shifted in increments of 0.1° in FIGS. 4 and 5, but may be shifted in increments of a different amount. Shifting the phase difference Δθ in increments of a smaller amount increases the resolution of control, but reduces feedback gain and leads to lower responsivity. The phase difference Δθ may therefore be shifted in increments of an amount which is appropriately determined by taking into account resolution and responsivity.

An optimum initial value of the phase difference Δθ may be determined in advance. For example, assume that dead-time compensation is started, with the optimum phase difference Δθ set to 10° and the initial value of the phase difference Δθ set to 0°. In this case, it takes time to carry out control, because phase adjustment does not end until the phase difference Δθ reaches the optimum value. Accordingly, by appropriately setting the initial value of the phase difference Δθ depending on the power system or in accordance with the characteristics of the power converter 1, the time required for the control can be reduced.

Figure 6:
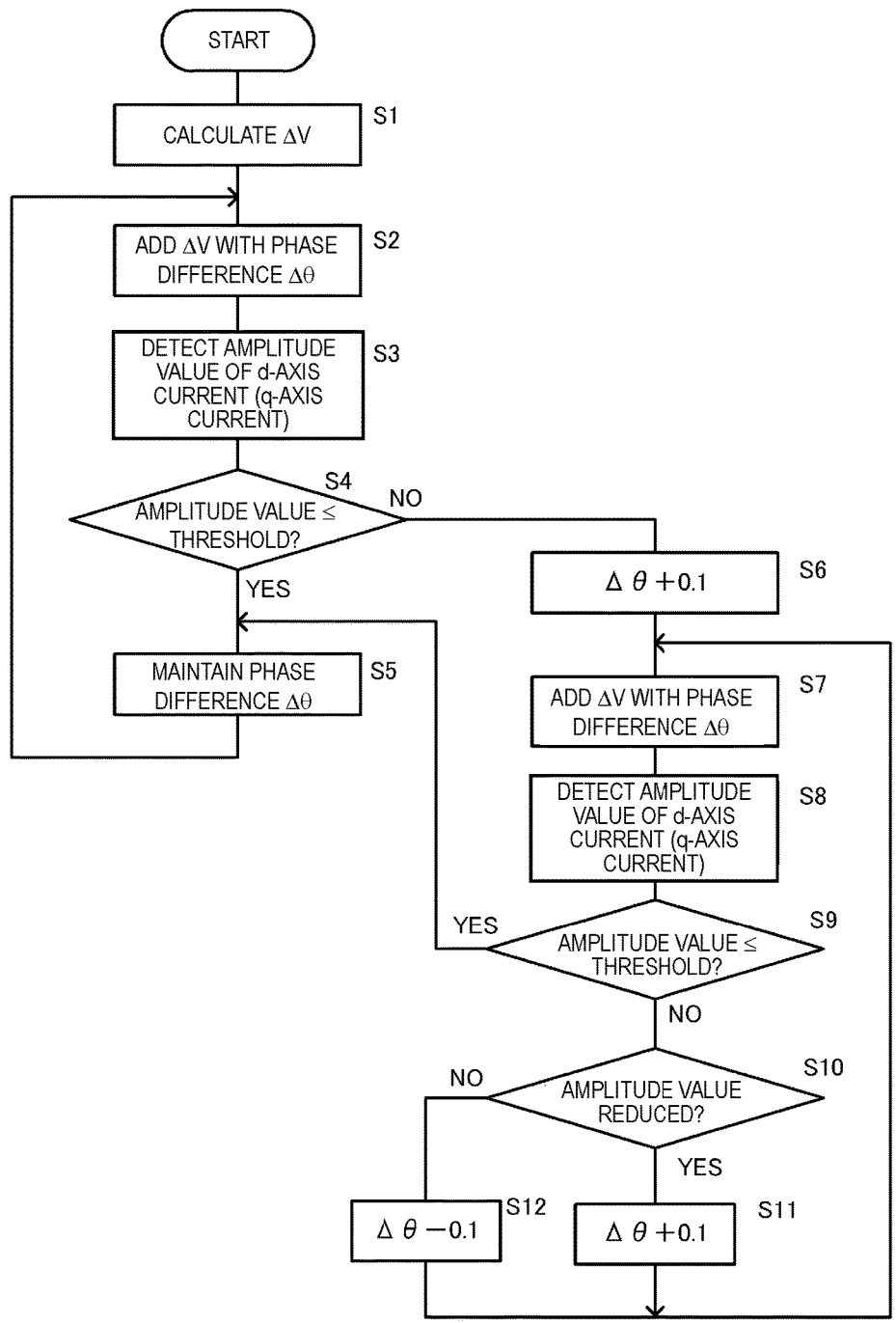
FIG. 6 is a flowchart illustrating a method for adjusting a phase difference for dead-time compensation according to an exemplary aspect.

FIG. 6 is a flowchart illustrating a process that adjusts the phase difference Δθ for dead-time compensation. The process illustrated in FIG. 6 is executed by the microprocessor 11. As described below, the process illustrated in FIG. 6 has steps (S4 and S9) for determining whether the detected amplitude value is less than or equal to the threshold, but this is not essential for the exemplary embodiment of the present disclosure.

Initially, the microprocessor 11 is configured to calculate the amount of dead-time compensation ΔV from the switching frequency fc of the series circuits 2u, 2v, and 2w, the direct-current voltage Vdc, and the dead time td (step S1). The microprocessor 11 adds the calculated amount of dead-time compensation ΔV to the voltage command values Vu*, Vv*, and Vw*, with a shift of the phase difference Δθ (step S2). The phase difference Δθ used here is a preset initial value.

Furthermore, the microprocessor 11 performs dq transformation using complex numbers of detected currents Iu, Iv, and Iw, calculates d-axis current (or q-axis current) in a rotating coordinate system, and detects the amplitude value of the d-axis current (or q-axis current) (step S3). The microprocessor 11 determines whether the detected amplitude value is less than or equal to a threshold (step S4). The threshold is 1 A in the examples of FIGS. 4 and 5.

If the amplitude value of the d-axis current (or q-axis current) is less than or equal to the threshold (YES in step S4), the microprocessor 11 maintains the phase difference Δθ used in step S2 (step S5). The microprocessor 11 returns the process to step S2.

If the amplitude value of the d-axis current (or q-axis current) exceeds the threshold (NO in step S4), the microprocessor 11 shifts the phase difference Δθ by 0.1° in the leading direction (step S6). The phase difference Δθ may be shifted in the lagging direction here.

With the adjusted phase difference Δθ, the microprocessor 11 adds the amount of dead-time compensation ΔV calculated in step S1 to the voltage command values Vu*, Vv*, and Vw* (step S7). Then, as in step S3, the microprocessor 11 detects the amplitude value of the d-axis current (or q-axis current) (step S8). The microprocessor 11 determines whether the detected amplitude value is less than or equal to the threshold (step S9).

If the amplitude value of the d-axis current (or q-axis current) is less than or equal to the threshold (YES in step S9), the microprocessor 11 maintains the phase difference Δθ used in step S7 (step S5). If the amplitude value of the d-axis current (or q-axis current) exceeds the threshold (NO in step S9), the microprocessor 11 determines whether the amplitude value of the d-axis current (or q-axis current) has been reduced to be less than the previously detected amplitude value (step S10).

If the amplitude value has been reduced (YES in step S10), the microprocessor 11 shifts the phase difference Δθ by 0.1° in the leading direction as in step S6 (step S11) and executes the operation of step S7 again. If the amplitude value has not been reduced (NO in step S10), that is, if the amplitude value has been increased, the microprocessor 11 shifts the phase difference Δθ by 0.1° in the lagging direction, which is opposite that in step S6 (step S12), and executes the operation of step S7 again.

By executing the process described above, the microprocessor 11 can detect the optimum phase difference Δθ and accurately perform dead-time compensation. The microprocessor 11 that performs the dead-time compensation carries out the process in a rotating coordinate system obtained by dq transformation of a triaxial reference system. A large amount of computation can thus be avoided and no significant load is placed on the microprocessor 11. This allows the microprocessor 11 to accurately perform dead-time compensation in accordance with the phase difference Δθ that varies in real time.

If reverse power flow causes the system voltage of the power system to exceed a threshold (e.g., 107 V), the microprocessor 11 may perform control which involves outputting reactive power to the power system. Specifically, in this case, the microprocessor 11 detects the system frequency and calculates, on the basis of system frequency deviation, the reactive power to be injected into the power system. The microprocessor 11 then PWM-controls the switching circuit such that a voltage output from the power converter 1 has a pulse width corresponding to the calculated reactive power.

Outputting the reactive power causes the d-axis current (or q-axis current) to fluctuate. Dead-time compensation performed on the basis of the amplitude value of the fluctuating d-axis current (or q-axis current) does not stabilize the output of the power converter 1. Therefore, when outputting reactive power to the power system, the microprocessor 11 preferably maintains the phase difference Δθ used before the output of the reactive power and stops adjusting the phase difference Δθ. This stabilizes the output of the power converter 1. In this case, the microprocessor 11 corresponds to "reactive power output controller" as shown in FIG. 1B according to the present invention.

REFERENCE SIGNS LIST

Δθ: phase difference
C1, C2: capacitor
fc: switching frequency
IN1, IN2: input portion
Iu, Iv, Iw: phase current
Lu, Lv, Lw: inductor
OUT1, OUT2, OUT3: output portion
Pu, Pv, Pw: command signal
Q11, Q21, Q31: high-side switching element
Q12, Q22, Q32: low-side switching element
td: dead time
Vdc: direct-current voltage
Vu*, Vv*, Vw*: voltage command value
Vu, Vv, Vw: phase voltage
1: power converter
2u, 2v, 2w: series circuit
10: driver circuit
11: microprocessor
12U, 12V, 12W: current detecting circuit
13U, 13V, 13W: voltage detecting circuit

The invention claimed is:

1. A power converter for outputting three-phase alternating-current voltages to a power system, the power converter comprising:
   an inverter circuit including three series circuits each having a high-side switching element connected in series to a low-side switching element;
   a PWM controller configured to set a dead time in which the high-side and low-side switching elements of each series circuit are simultaneously turned off, the PWM controller being configured to switch the high-side and low-side switching elements based on a PWM voltage command value;
   a dead-time compensation calculator configured to calculate an amount of dead-time compensation for reducing distortion caused by setting the dead time;
   a dead-time compensator configured to add the calculated amount of dead-time compensation to the PWM voltage command value, with a shift of a deemed phase difference from a phase of a corresponding one of the three-phase alternating-current voltages;

a current amplitude detector configured to detect an amplitude value of d-axis current or q-axis current in a rotating coordinate system obtained by dq transformation of output currents from the respective three series circuits; and a deemed phase difference adjustor configured to change the deemed phase difference to reduce the amplitude value detected by the current amplitude detector.

2. The power converter according to claim 1, further comprising a reactive power output controller configured to output reactive power to the power system when a system voltage of the power system exceeds a threshold.

3. The power converter according to claim 2, wherein the deemed phase difference adjustor is configured to stop changing the deemed phase difference when the reactive power output controller outputs the reactive power.

4. The power converter according to claim 1, further comprising three outputs each coupled to a respective node between the high-side and low-side switching elements of each series circuit, respectively.

5. The power converter according to claim 4, wherein the current amplitude detector is coupled to the three outputs for detecting the respective output currents from the respective three series circuits.

6. The power converter according to claim 1, wherein the three series circuits are connected in parallel to each other with each of the high-side switching element and the low-side switching element coupled to respective inputs of the power converter.

7. The power converter according to claim 6, wherein the respective inputs of the power converter are coupled to at least one of a solar, gas and wind power generator and configured to receive a direct-current voltage therefrom, such that the inverter circuit is configured to convert the received direct-current voltage to the three-phase alternating-current voltages.

8. A power converter for outputting three-phase alternating-current voltages to a power system, the power converter comprising:

an inverter circuit including at least three series circuits each having a high-side switching element connected in series to a low-side switching element;

a PWM controller configured to set a dead time in which the high-side and low-side switching elements of each series circuit are simultaneously turned off, the PWM controller being configured to switch the high-side and low-side switching elements based on a PWM voltage command value;

a dead-time compensator configured to calculate an amount of dead-time compensation for reducing distortion caused by setting the dead time by adding the calculated amount of dead-time compensation to the PWM voltage command value; and a current amplitude detector configured to detect an amplitude value of d-axis current or q-axis current in a rotating coordinate system obtained by dq transformation of output currents from the respective at least three series circuits, wherein the dead-time compensator is configured to perform dead-time compensation to reduce a range of fluctuation of the amplitude value detected by the current amplitude detector, and wherein the dead-time compensator is further configured to calculate the amount of dead-time compensation by changing phases of the three-phase alternating-current voltages by a deemed phase difference being a predetermined phase difference.

9. The power converter according to claim 8, further comprising a reactive power output controller configured to output reactive power to the power system when a system voltage of the power system exceeds a threshold.

10. The power converter according to claim 9, wherein the dead-time compensator is configured to stop changing the phases of the three-phase alternating-current voltages when the reactive power output controller outputs the reactive power.

11. The power converter according to claim 8, further comprising three outputs each coupled to a respective node between the high-side and low-side switching elements of each series circuit, respectively.

12. The power converter according to claim 11, wherein the current amplitude detector is coupled to the three outputs for detecting the respective output currents from the respective three series circuits.

13. The power converter according to claim 8, wherein the three series circuits are connected in parallel to each other with each of the high-side switching element and the low-side switching element coupled to respective inputs of the power converter, and wherein the respective inputs of the power converter are coupled to at least one of a solar, gas and wind power generator and configured to receive a direct-current voltage therefrom, such that the inverter circuit is configured to convert the received direct-current voltage to the three-phase alternating-current voltages.

14. A power converter configured to output three-phase alternating-current voltages to a power system, the power converter comprising:

an inverter circuit including three series circuits each having a high-side switching element connected in series to a low-side switching element; and a microprocessor configured to:

set a dead time in which the high-side and low-side switching elements of each series circuit are simultaneously turned off based on a PWM voltage command value, calculate an amount of dead-time compensation for reducing distortion caused by setting the dead time, add the calculated amount of dead-time compensation to the PWM voltage command value, with a shift of a deemed phase difference from a phase of a corresponding one of the three-phase alternating-current voltages, determine an amplitude value of d-axis current or q-axis current in a rotating coordinate system obtained by dq transformation of output currents from the respective three series circuits, and change the deemed phase difference to reduce the amplitude value determined by the microprocessor.

15. The power converter according to claim 14, further comprising:

a reactive power output controller configured to output reactive power to the power system when a system voltage of the power system exceeds a threshold, wherein the microprocessor is configured to stop changing the deemed phase difference when the reactive power output controller outputs the reactive power.

16. The power converter according to claim 14, further comprising three outputs each coupled to a respective node between the high-side and low-side switching elements of each series circuit, respectively.

17. The power converter according to claim 16, further comprising a current amplitude detector coupled to the three outputs for detecting the respective output currents from the respective three series circuits.

18. The power converter according to claim 14, wherein the three series circuits are connected in parallel to each other with each of the high-side switching element and the low-side switching element coupled to respective inputs of the power converter.

19. The power converter according to claim 14, wherein the respective inputs of the power converter are coupled to at least one of a solar, gas and wind power generator and configured to receive a direct-current voltage therefrom, such that the inverter circuit is configured to convert the received direct-current voltage to the three-phase alternating-current voltages.

\* \* \* \* \*